United States Patent [19]
Gillis et al.

[11] Patent Number: 5,852,107
[45] Date of Patent: Dec. 22, 1998

[54] INTERNAL MOLD RELEASE COMPOSITIONS

[75] Inventors: Herbert Russell Gillis, West Deptford, N.J.; Paul William Mackey, Sylvan Lake, Minn.

[73] Assignee: Imperial Chemical Industries PLC, London, England

[21] Appl. No.: 476,525

[22] Filed: Jun. 7, 1995

Related U.S. Application Data

[60] Division of Ser. No. 375,883, Jan. 20, 1995, which is a continuation-in-part of Ser. No. 245,994, May 19, 1994, abandoned, which is a continuation-in-part of Ser. No. 202,303, Feb. 25, 1994, abandoned.

[51] Int. Cl.⁶ ..................................... C08L 75/04
[52] U.S. Cl. .................... 524/724; 524/188; 524/217; 524/218; 524/238; 524/315; 524/318; 524/588; 524/731; 524/773; 524/774; 524/775; 524/839
[58] Field of Search ........................ 524/731, 399, 524/783, 864, 92, 724, 773, 774, 775, 839, 188, 217, 238, 315, 318, 588; 252/35; 264/136

[56] References Cited

U.S. PATENT DOCUMENTS

| | | | |
|---|---|---|---|
| 5,384,357 | 1/1995 | Gillis | 524/399 |
| 5,484,829 | 1/1996 | Gillis | 524/92 |

*Primary Examiner*—Patricia A. Short

[57] ABSTRACT

An internal mold release system is provided which comprises (a) a polysiloxane compound; and (b) an amine salt of a carboxylic acid.

25 Claims, No Drawings

INTERNAL MOLD RELEASE COMPOSITIONS

CROSS REFERENCE TO RELATED APPLICATIONS

The present application is a divisional of U.S. patent application Ser. No. 08/375,883, filed Jan. 20, 1995, which is a continuation-in-part of application Ser. No. 08/245,994, filed May 19, 1994 now abandoned, which in turn is a continuation-in-part of application Ser. No. 08/202,303 filed Feb. 25, 1994, now abandoned.

FIELD OF THE INVENTION

The present invention is related to internal mold release systems. More specifically, the present invention is directed to internal mold release systems which are particularly useful in structural reaction injection molding applications.

BACKGROUND OF THE INVENTION

The present invention relates to internal mold release systems which may be used in the preparation of reaction injected polyurethanes and polyurea foam articles. These internal mold release systems are particularly useful in manufacturing shaped resin components by the structural reaction injection molding process (SRIM), wherein a liquid stream of polyisocyanate is impingement mixed with at least one other stream containing active hydrogen-containing liquids, catalysts, fillers and the mold release systems and transferred to a heated metal mold. A glass mat, or a mat of other structural fibers, is placed into the mold prior to the impingement mixing of the components so that the obtained part is a reinforced composite. SRIM processes are used commercially to manufacture various articles where high strength and low weight are of importance. For example, SRIM processes are used to manufacture interior trim substrates for automobiles, such as door panels, package trays, speaker enclosures and seat pans.

Developments in the chemistry of the polymer systems used in SRIM have resulted in urethane and urethane-urea polymers which are sufficiently cured to be demolded within about 40–60 seconds after injection. SRIM equipment has also improved so that the mechanics of opening and closing the mold also require only about 30–40 seconds. Urethane polymers are excellent adhesives and bond tenaciously to metal making it necessary to utilize a release agent so that parts can be quickly and easily removed without damage or distortion.

External mold release agents have been used by applying the release agent to the surfaces of the mold. The molds must be completely covered with the release agent, generally by spraying a solution or an emulsion of a soap or wax thereon. This procedure requires 30–60 seconds and must be done at least after every one to five parts, thus increasing the part to part cycle time by as much as 50%. Additionally, this constant spraying often causes excessive mold release agent to build up on areas surrounding the mold surface or on the mold surface itself. In this instance, the mold must be periodically wiped off and/or cleaned by solvent or detergent wash. This experience is time consuming and costly for the part manufacturer.

Thus, it is clear that mold release agents or systems which could be included in the reaction systems themselves, i.e., internal mold release agents or systems, would be advantageous in eliminating such difficulties, increasing productivity and reducing part cost. Various internal mold release agents have been proposed in an attempt to solve these problems. For example, U.S. Pat. No. 4,546,154 discloses the use of 0.5–1.5 percent by weight of polysiloxane mold release agents in reaction injection molding systems for this purpose. However, such materials have been found to provide an insufficient number of releases to make their use acceptable commercially.

Certain acids, such as fatty acids and their esters are known to act as mold release agents. For example, U.S. Pat. No. 4,098,731 discloses the use of salts of saturated or unsaturated aliphatic or cycloaliphatic carboxylic acids containing at least eight carbon atoms and tertiary amines which do not contain amide or ester groups as release agents for polyurethane foam production. U.S. Pat. No. 4,024,090 discloses the use of internal mold release agents which are the esterification reaction products of polysiloxanes and monocarboxylic or polycarboxylic acids. U.S. Pat. Nos. 5,128,807, 4,058,492, 3,993,606 and 3,726,952 all also disclose the use of carboxylic acids or their derivatives as mold release agents. U.S. Pat. No. 4,130,698 discloses the use of esters of a fatty acid, such as glycerol trioleate, olive oil and peanut oil, as a processing aid. However, such systems have proven to be disadvantageous as they provide an insufficient number of releases, particularly in SRIM systems.

Accordingly, it can be seen that there is a need for internal mold release systems which provide a sufficient number of releases to make them suitable for widespread commercial use. Thus, it is an objective of the present invention to provide internal mold release systems which result in a significantly higher number of releases in comparison to known systems. It is a further objective of the present invention to provide internal mold release systems which are particularly suitable for use in SRIM systems.

SUMMARY OF THE INVENTION

The above-mentioned objectives are attained by the present invention which is directed to an improvement over known internal mold release systems, particularly in SRIM applications. The present internal mold release systems comprise a combination of materials which provide synergistic release activity and thus provide improved release activity in comparison to known systems.

The present invention is directed to internal mold release systems comprising (a) a polysiloxane compound and (b) an amine salt of a carboxylic acid. The present invention is further directed to reaction systems comprising an organic polyisocyanate; a compound containing a plurality of isocyanate-reactive groups; and an internal mold release system comprising (a) a polysiloxane compound and (b) an amine salt of a carboxylic acid.

The present invention is further directed to internal mold release systems comprising (a) a polysiloxane compound; (b) an amine salt of a carboxylic acid; and (c) a fatty acid ester, as well as reaction systems containing such mold release systems.

DETAILED DESCRIPTION OF THE INVENTION

In its broadest sense, the present internal mold release systems comprise (a) a polysiloxane compound and (b) an amine salt of a carboxylic acid. The present systems have been found to be particularly effective in structural reaction injection molding (SRIM) systems. It has been found by the present inventors that a combination of the polysiloxane compound and the carboxylic acid salt compound have synergistic effects. That is, although the polysiloxane compound and the carboxylic acid salt compound each have mold release properties when used alone, their combination has proven to be surprisingly more effective.

Although not wishing to be bound by any single theory, it is the belief of the present inventors that the internal mold release systems of the present invention provide release activity through phase separation. More specifically, it is theorized that the carboxylic acid salt compound reacts with the polyisocyanate present in the reaction systems to form an insoluble amide. It is this amide which apparently phase separates to provide the improved release activity.

In general, any carboxylic acid compounds containing an aliphatic hydrocarbon chain are useful in the present mold release systems. However, it is preferred that the carboxylic acid be liquid or polyol soluble. In general, useful carboxylic acid compounds comprise about 3 to about 100, preferably about 6 to about 54 and most preferably about 18 to about 36 carbon atoms. The carboxylic acid compounds should also have an acid functionality of about 1 to about 4 and preferably about 1 to about 2. In general, it has been found that release activity of the present systems increases with decreasing functionality of the carboxylic acid compound. Both mono-acids and dimer acids may be used. The trimer (and higher functionality) content of the acid compounds may range from about 1 to about 60%.

Useful carboxylic acid compounds include dimerized oleic acid, oleic acid, adipic acid, lauric acid, stearic acid, hydroxystearic acid, terephthalic acid, behenic acid, arachidic acid, linoleic acid, linolenic acid, ricinoleic acid and mixtures thereof. Preferably, the carboxylic acid compound used in the present system is oleic acid and dimerized oleic acid available commercially as Hystrene® 3695, 3675 or 5460 from Witco Chemicals.

The carboxylic acid compounds used in the present internal release systems are present as the amine salt thereof. Useful salts include primary, secondary and tertiary amine salts, although it is preferred to use tertiary amine salts. It is understood that the term "amine" as used herein is meant to include other nitrogen-containing organic bases capable of forming salts with carboxylic acids. These include amidine and guanidine compounds. Useful salts include tertiary aliphatic amines which contain other isocyanate-reactive functional groups, such as hydroxyl groups, primary or secondary amino groups, amide groups, ester groups, urethane groups or urea groups. Moreover, it is contemplated that useful salts may contain more than one tertiary amine group per molecule.

Preferred tertiary aliphatic amines for use in the present invention include N,N-dimethylcyclohexylamine, N,N-dimethyl aminopropylamine and aliphatic tertiary amine-containing amides of fatty acids, such as the amides of N,N-dimethyl aminopropylamine with stearic acid, oleic acid, hydroxystearic acid and dihydroxystearic acid.

Other useful tertiary aliphatic amines include those prepared by the reaction of oleic or dimer acids with triethanolamine, triisopropanolamine N-methyl diethanolamine, triethylenediamine, bis-(dimethylamino)-diethyl ether, N-ethyl-morpholine, N,N,N',N',N"-pentamethyl diethylenetriamine, N,N-dimethyl ethanolamine and mixtures thereof.

Commercially available tertiary aliphatic amines include the Polycat® series of amines and the Dabco® amine catalysts both available from Air Products Inc.

The second component of the present internal mold release systems is a polysiloxane compound. The polysiloxane compounds comprise about 0.5 to 20 mol % of $R_aR'_bSiO_{[4-(a+b)]/2}$ units and from about 80 to 99.5 mol % of $R''_cSiO_{(4-c)/2}$ units wherein:

R is an isocyanate reactive organic radical, a has an average value of from about 1 to about 3, R' and R" are non-isocyanate reactive organic radicals, b has an average value of about 0 to about 2, a+b has an average value of from about 1 to about 3, c has an average value from about 1 to about 3 and preferably 1 to 1.5, wherein the ratio of the total molecular weight of the polysiloxane compound to the total number of isocyanate reactive functional groups in the polysiloxane molecule (the equivalent weight) ranges from 100–3500 and preferably from 500 to 2500;

the combined formula weights of all isocyanate reactive organic radicals R do not exceed 40% of the total molecular weight of the polysiloxane compound;

the combined formula weights of all non-isocyanate reactive radicals R'+R" together do not exceed 40% of the total molecular weight of the polysiloxane compound;

the combined formula weights of all the organic radicals R+R'+R" in the molecule together do not exceed about 55 to 60% of the total molecular weight of the molecule;

the polysiloxane compound contains an average of at least two isocyanate reactive functional groups per molecule;

at least two of the isocyanate reactive functional groups in each molecule are located on separate organic radicals R, attached independently to different silicon atoms in the polysiloxane compound;

the isocyanate reactive functional groups R are selected from the group consisting of alcohols, carboxylic acids, phenols, thiols, imino groups, enamine groups, primary or secondary aromatic amines which contain no oxygen and have not more than one nitrogen atom attached directly to, in conjugation with or incorporated within, the aromatic ring nucleus, and secondary aliphatic amines wherein at least one of the alkyl carbon atoms, bonded directly to the nitrogen atom, is not a primary carbon atom;

the molecular weight of the polysiloxane compound is between 1000 and 30,000, preferably 2,000–15,000 and most preferably 4,000–8,000; and the polysiloxane compounds are substantially insoluble in liquid polyisocyanates.

In the polysiloxane compounds, the isocyanate-reactive organic R radicals can be attached to the silicon atom directly to carbon or through oxygen, nitrogen or sulfur carbon bonds. Preferred R radicals are those of the formula HO—R'"—, $H_2N$—R'"—, $HNR_2$'"—, R'"—CHOHCH$_2$OH, R'"CHOHCH$_3$, R'"—CH$_2$SH and HS—R'"—wherein R'" is a divalent linking group comprised of carbon and hydrogen; carbon, hydrogen and oxygen; carbon, hydrogen and sulfur; carbon, hydrogen and nitrogen; or carbon, hydrogen, oxygen and nitrogen. Specific examples of R'" include the methylene, ethylene, propylene, hexamethylene, decamethylene, —CH$_2$CH(CH$_3$)—CH$_2$—, phenylene, butyl phenylene, naphthylene, —CH$_2$CH$_2$SCH$_2$CH$_2$—, —CH$_2$CH$_2$OCH$_2$—, —CH$_2$CH$_2$—CH$_2$—O(CH$_2$—CHR'O)$_n$—, where n is 0–5 and R' is described as above or H. A preferred R group is —CH$_2$CH$_2$CH$_2$O(CH$_2$CH(CH$_3$)O)$_n$H where n is 1–5. Preferably, the R'" linking group contains from 3–10 atoms in addition to hydrogen atoms. There can be from 1–33 functional R radicals, preferably 3–10, and from 1–3 attached to a silicon atom.

As indicated above, the R' radical can be any hydrocarbon or substituted organic radical. Illustrative R' radicals present are alkyl radicals such as the methyl, ethyl, propyl, butyl, amyl, hexyl, octyl, decyl, dodecyl, octadecyl, and myricyl radicals; alkyenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenyethyl radicals; alkaryl radicals such as the tolyl, xylyl and mesityl radicals; the corresponding halohydrocarbon radicals such as 3-chloropropyl, 4-bromobutyl, 3,3,3-tri-fluoropropyl, chlorocyclohexyl, bromophenyl, chlorophenyl, alpha,alpha,alpha-tri-fluorotolyl and the dichloroxenyl radicals; the corresponding cyanohydrocarbon radicals such as 2-cyanoethyl, 3-cyanopropyl and cyanophenyl radicals; the corresponding hydrocarbon radicals, such as ether and ester hydrocarbon radicals such as —$(CH_2)_3OC_2H_5$, $(CH_2)_3OCH_3$, —$(CH_2)_3COOC_2H_5$ and —$(CH_2)_3COOCH_3$, the corresponding thioether and thioester hydrocarbon radicals such as —$(CH_2)_3SC_2H_5$ and —$(CH_2)_3COSCH_3$; and nitrohydrocarbon radicals such as the nitrophenyl and 3-nitropropyl radicals.

It is preferred that the R' radical be an organic radical containing from 1 to 10 atoms. In the most preferred embodiment of this invention at least 90% of all the R' radicals are methyl radicals. There can be an average of from 0 to 2 R' radicals attached to the silicon atom, i.e., b has an average of from 0 to 2 in the above formula.

The R" radical in the polysiloxane compounds useful in this invention can also be any hydrocarbon or substituted hydrocarbon radical. The illustrative examples set forth above with respect to R' are equally applicable here. Likewise, the preferences set forth for R' above apply to the R" radical. There can be from 0 to 3 R" radicals, on the average, per silicon atom, i.e., c has an average value of from 1 to 3 in the above formula.

Most preferably, the R, R' and R" radicals are all organic radicals attached to the silicon atom by carbon to silicon bonds, by carbon-oxygen-silicon bonds or by carbon-sulfur-silicon bonds.

These polysiloxane compounds may be prepared by well known techniques which will be evident to those skilled in the art from the present disclosure. However, these compounds are usually formed by grafting an olefin-containing organic modifying group or polyoxyalkylene oxide onto a "methylhydrogen siloxane" modified polydimethylsiloxane using a platinum catalyzed hydrolization reaction.

The polysiloxanes can be either solid or liquid in form and are required to be substantially insoluble in isocyanate liquid. In order to use a solid functional siloxane it would be necessary to dissolve, disperse or suspend the polysiloxane in one or more silicon surfactants. Hence, it is preferred that the functional siloxane employed be in liquid form. While the viscosity of the liquid siloxane can vary over a wide range, for example, from 1 to 100,000 centistokes, it is generally preferred that the viscosity be in the range of from 50 to 1000 centistokes. The molecular weight of the siloxanes can vary from 1000 to 30,000, preferably 2000–15,000 and most preferably 4000–8000.

Commercially available polysiloxane compounds useful in the present binder compositions include DC 1248 available from Dow Corning and Goldschmidt 412T available from Goldschmidt, Inc.

The preferred polysiloxane compounds are those set forth below, wherein the value listed for (a) is the equivalent weight, (b) is the combined formula weights of reactive radicals R expressed as percent of the molecular weight, and (c) is the combined formula weights of non-isocyanate reactive groups R'+R" expressed as percent of the molecular weight:

"Polysiloxane I" is a hydroxy functional polysiloxane polyether copolymer internal release agent having the approximate formula:

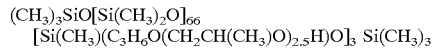

having a molecular weight of about 6000, a hydroxy equivalent weight (a) of 2000, (b) is 11%, (c) is 35%, and a viscosity of 160 centistokes.

"Polysiloxane II" is a hydroxy functional thioether copolymer internal release agent having the approximate formula:

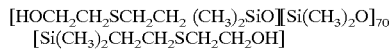

having a hydroxy equivalent weight (a) of 2750, a molecular weight of 5500, a value for (b) of 4.3%, (c) is 39% and a viscosity of about 55 centistokes.

"Polysiloxane III" has an approximate formula as follows:

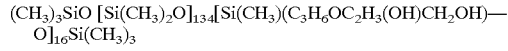

having a molecular weight of 13,136, an equivalent weight of (a) 411, (b) is 16% and (c) is 33%.

"Polysiloxane IV" has an approximate formula as follows:

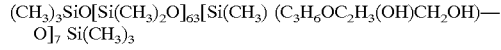

having a molecular weight of 6,154, an equivalent weight (a) of 440, (b) is 15%, and (c) is 34%.

"Polysiloxane V" has an approximate formula:

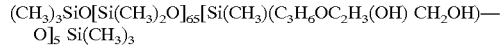

having a molecular weight of 5918, an equivalent weight (a) of 592, (b) is 11%, and (c) is 34%.

"Polysiloxane VI" has an approximate formula:

having a molecular weight of 6980, an equivalent weight (a) of 249, (b) is 26%, and (c) is 28%.

"Polysiloxane VII" has an approximate formula:

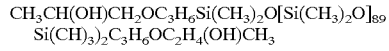

having a molecular weight of 6962, an equivalent weight of (a) 3481, (b) is 3.4%, and (c) is 39%.

"Polysiloxane VIII" has an approximate formula:

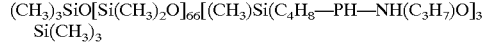

where PH=phenylene, having a molecular weight of 5782, and an equivalent weight (a) of 1927, (b) is 9.9% and (c) is 37%.

"Polysiloxane IX" has an approximate formula:

having a molecular weight of 7550, an equivalent weight (a) of 108, (b) is 33% and (c) is 26%.

"Polysiloxane X" has an approximate formula:

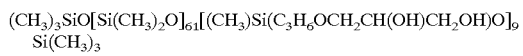

having a molecular weight of 6390, an equivalent weight (a) of 355, (b) is 19% and (c) is 32%.

Polysiloxane I is particularly preferred.

The present mold release systems generally contain about 0.5 to about 12.0 weight percent and preferably about 2.5 to about 4.0 weight percent of the carboxylic acid salt compound and about 0.05 to about 6.0, preferably about 0.1 to about 2.0 and more preferably about 0.50 to about 0.75 weight percent of the polysiloxane compound based upon the weight of the reaction system. In its most preferred form, the present internal mold release systems comprise about 2.9% by weight of the carboxylic acid salt and about 0.6 % by weight of the polysiloxane compound.

In another aspect of the present invention, the mold release systems further comprise a fatty acid ester compound. The fatty acid ester compounds useful in the present invention contain at least about 22 carbon atoms and preferably at least about 31 carbon atoms. The maxiumum number of carbon atoms in the fatty acid ester is limited only in that compounds should not be used when the carbon number causes the material to be unsuitable for blending with or into a polyol. Suitable compounds are the esters of stearic acid, oleic acid, linoleic acid, linolenic acid, adipic acid, behenic acid, arachidic acid, montanic acids, isostearic acid, polymerized acids and mixtures thereof.

Examples of suitable fatty acid esters include butyl stearate, tridecyl stearate, glycerol trioleate, isocetyl stearate, ditridecyl adipate and dioctyl dimerate. Commercially available fatty acid esters suitable for use in the present invention include the Kemester series of acids available from Witco Chemical, including Kemester 5510, Kemester 5721, Kemester 5822, Kemester 3681, Kemester 5654 and Kemester 1000.

In this embodiment of the present invention, the mold release systems contain about 2 to about 6% and preferably about 3 to about 5% of the fatty acid ester compound based upon the weight of the reaction system.

In yet another aspect of the present invention, the mold release system may comprise (a) a polysiloxane compound and (b) a fatty acid ester compound. Any of the polysiloxanes and fatty acid ester compounds discussed above may be used in this embodiment of the present invention.

In this embodiment, the present mold release systems comprise about 1 to about 6 weight percent and preferably about 3 to about 5 weight percent of the fatty acid ester compound and about 0.1 to about 2.0 weight percent, preferably about 0.50 to about 0.75 weight percent of the polysiloxane compound.

The internal mold release systems of the present invention may be prepared by any suitable method known to those skilled in the art as will be evident from the present specification. For example, the present internal mold release systems may be prepared by simply mixing the carboxylic acid salt compound and the polysiloxane compound into the component of the reaction system containing the plurality of isocyanate-reactive groups or the "B side" of the reaction system. Although it may be formed separately, it is preferred that the acid salt compound be formed by mixing the free acid and the amine into the bulk of the isocyanate-reactive component. The B side of the system is then reacted with a polyisocyanate component or the "A side" of the system in order to form the final polyurethane product. The carboxylic acid salt compound and the polysiloxane compound are generally not reacted prior to their addition to the B side of the reaction system as no reaction of these two components is desired.

The present invention is further directed to reaction systems for use in SRIM processes comprising, in part, the present internal mold release systems. The reaction systems also comprise an organic polyisocyanate and a component containing at least one compound comprising a plurality of isocyanate-reactive groups. This component will contain the present mold release systems.

The organic polyisocyanates useful in the present invention are those having a number average isocyanate functionality in the range of from about 1.8 to about 4.0. Preferably, the number average isocyanate functionality is from about 2.3 to about 3.0.

The organic polyisocyanates which may be used in the present systems include any of the aliphatic, cycloaliphatic, araliphatic, or aromatic polyisocyanates known to those skilled in the art, especially those that are liquid at room temperature. Examples of suitable polyisocyanates include 1,6-hexamethylene diisocyanate, isophorone diisocyanate, cyclohexane, 1,4-diisocyanate, 4,4'dicyclohexylmethane diisocyanate, 1,4-xylylene diisocyanate, 1,4-phenylene diisocyanate, 2,4-toluene diisocyanate, 2,6-toluene diisocyanate, 4,4'diphenylmethane diisocyanate (4,4'MDI), 2,4'diphenylmethane diisocyanate (2,4'MDI), polymethylene polyphenylene polyisocyanates (crude MDI) and 1,5 naphthylene diisocyanate. Mixtures of these polyisocyanates can also be used. Moreover, polyisocyanates which have been modified by the introduction of urethane, allophanate, urea, biuret, carbodiimide, uretonimine or isocyanurate residues can also be used in the present systems.

In general, the aromatic polyisocyanates are preferred for use in the present reaction systems. The most preferred aromatic polyisocyanates are 4,4'-MDI, 2,4'-MDI, polymeric MDI, MDI variants and mixtures thereof. Isocyanate-terminated prepolymers may also be employed. Such prepolymers are generally prepared by reacting an excess of polymeric or pure isocyanate with polyols, including aminated polyols, imine or enamine polyols, polyether polyols, polyester polyols or polyamines. Psuedoprepolymers, which are a mixture of prepolymer and one or more monomeric di- or polyisocyanates, may also be used.

Commercially available polyisocyanates useful in the present reaction systems include the Rubinate® series of polymeric isocyanates available from ICI Americas Inc.

In most cases, the component of the reaction systems containing at least one compound containing a plurality of isocyanate-reactive groups is a combination of at least two isocyanate-reactive compounds. Optionally, at least one of these is a softblock component. Softblock components useful herein include those conventionally used in the art. The term "softblock" is well known to those in the art. It is the soft segment of a polyurethane, realizing that the polyurethane may encompass isocyanurate rings, urea or other linkages. The isocyanate-reactive compound(s) also generally comprises at least one chain extender and/or cross-linker.

Isocyanate-reactive materials which furnish softblock segments are well known to those skilled in the art. Such compounds generally have a molecular weight of at least about 1500 and preferably about 1500 to about 8000, a number-average equivalent weight of from about 400 to about 4000 preferably from about 750 to about 2500, and a number-average functionality of isocyanate-reactive groups of about 2 to about 10 and preferably from about 2 to about 4. Such compounds include e.g., polyether or polyester polyols comprising primary or secondary hydroxyl groups. Preferably, the softblock segments comprise about 0 to about 30 wt % and more preferably about 0 to about 20 wt % of the isocyanate-reactive species of the compound containing a plurality of isocyanate-reactive groups. It is most preferred that the isocyanate-reactive compound(s) comprise (a) about 0 to about 20 wt % of at least one polyol having a molecular weight of 1500 or greater and a functionality of 2 to 4; (b) about 70–98% wt % of at least one polyol having a molecular weight of between about 200 and 500 and a functionality of about 3; and (c) about 2 to about 15 wt % of at least one polyol having a functionality of about 3 and a molecular weight of less than 200.

Suitable polyether polyols which can be employed herein include those which are prepared by reacting an alkylene oxide, halogen-substituted or aromatic-substituted alkylene oxide or mixtures thereof with an active hydrogen-containing initiator compound.

Suitable oxides include, for example, ethylene oxide, propylene oxide, 1,2-butylene oxide, styrene oxide, epichlorohydrin, epibromohydrin, and mixtures thereof.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid and mixtures thereof.

Suitable initiators include, for example, ammonia, ethylenediamine, diaminopropanes, diaminobutanes, diaminopentanes, diaminohexanes, diethylenetriamine, triethylenetetramine, tetraethylenepentamine, pentanethylenehexamine, ethanolamine, aminoethylethanolamine, aniline, 2,4-toluenediamine, 2,6-toluenediamine, diaminodiphenylmethane, 4,4'-diaminodiphenylmethane, 1,3-phenylenediamine, 1,4-phenylenediamine, naphthylene-1,5-diamine, triphenylmethane 4,4',4"-triamine, 4,4'-di(methylamino)-diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetra-ethyl-4,4'-diamino-diphenylmethane and amine aldehyde condensation products such as the polyphenylpolymethylene polyamines produced from aniline and formaldehyde and mixtures thereof.

Suitable polyester polyols include, for example, those prepared by reacting a polycarboxylic acid or anhydride with a polyhydric alcohol. The polycarboxylic acids may be aliphatic, cycloaliphatic, aromatic and/or heterocyclic and may be substituted (e.g., with halogen atoms) and/or unsaturated. Examples of suitable carboxylic acids include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; dimeric and trimeric fatty acids, such as oleic acid, which may be in admixture with monomeric fatty acids; terephthalic acid dimethyl ester; therephthalic acid bisglycol ester and mixtures thereof.

Examples of suitable polyhydric alcohols include ethylene glycol, 1,2-propylene glycol; 1,3-propylene glycol; 1,3-, 1,4-, 1,2- and 2,3-butylene glycol; 1,6-hexane diol; 1,8-octane diol; neopentyl glycol; cyclohexane dimethanol (1,4-bis-hydroxylmethyl cyclohexane); 2-methyl-1,3-propane diol, glycerol; trimethylol propane; 1,2,6-hexane triol,; 1,2,4-butane triol; trimethylol ethylane; pentaerythritol; quitinol; mannitol; sorbitol; methylglycoside; diethylene glycol; triethylene glycol; tetraethylene glycol; polyethylene glycol; dipropylene glycol; polypropylene glycol; dibutylene glycol; polybutylene glycol and the like. The polyesters may contain some terminal carboxy groups. It is also possible to use polyesters of lactones such as caprolactone, or hydroxy carboxylic acids such as hydroxy caproic acid.

The present reaction systems comprise chain extenders and/or cross-linkers. Suitable chain extenders or crosslinkers will be evident to those skilled in the art from the present disclosure. In general, useful chain extenders will have a molecular weight below about 1500 and preferably about 62 to about 750 and a functionality of about 1.8 to about 2.5 and preferably about 1.9 to about 2.2 Suitable chain extenders may be selected from polyols such as ethylene glycol, diethylene glycol, butanediol, dipropylene glycol and tripropylene glycol; aliphatic and aromatic amines, e.g., 4,4'-methylene dianilines having a lower alkyl substituent positioned ortho to each N atom; imino-functional compounds such as those disclosed in European Patent Applications 284 253 and 359 456 and enamino-functional compounds such as those disclosed in European Patent Application 359 456. Suitable cross-linking agents include glycerol, oxyalkylated glycerol, pentaerithritol, sucrose, trimethylolpropane, sorbitol and oxyalkylated polyamines. The functionality of the cross-linkers may range from about 2.6 to about 8, preferably about 3 to about 4, and the molecular weight may vary between the same ranges as disclosed above with regard to the chain extender. A preferred class of crosslinkers includes oxypropylated derivatives of glycerol having a molecular weight of about 200 to about 500, glycerol and mixtures thereof The most preferred isocyanate-reactive compound for use in the present reaction system is LG-650, a propylene oxide adduct of glycerol having a functionality of 3 and an OH equivalent weight of 86 available from Arco Chemicals and blends thereof with glycerol. In this instance, the weight ratio of LG-650 to glycerol may be about 99:1 to about 50:50, preferably about 98:2 to about 90:10 and most preferably about 95:5 to about 90:10. This blend preferably comprises about 70 to about 98 and preferably about 80 to about 95% of the isocyanate-reactive compound(s).

A preferred class of isocyanate-reactive components useful in the present invention are those which contain water in addition to the isocyanate-reactive compounds discussed above. The water acts as a foaming agent, reacting with the isocyanate to provide $CO_2$ and urea linkages. Water is used in amounts up to about 10 wt %, preferably about 0.1 to about 5% and more preferably about 0.25 to about 4% by weight of the total isocyanate reactive compounds or B side of the composition.

The reaction systems of the present invention may be prepared by any conventional method which will be evident to one skilled in the art from the present disclosure. For example, the polyisocyanate component (or A side) of the reaction system may be mixed with the isocyanate-reactive component(s) (or B side) in conventional low or high pressure impingement mixing machines known in the SRIM art.

The polyisocyanate component and the isocyanate-reactive component(s) are mixed at weight ratios such that the ratio of the number of isocyanate groups to isocyanate-reactive groups (commonly known as the index) is from about 75 to about 150%, with the proviso that when catalysts for the trimerization of isocyanates are used, the index may extend up to about 500%. Preferably, the index is from about 90 to about 115 and more preferably about 95 to about 105%.

The present invention is further directed to a process for producing molded articles comprising reacting (1) an organic polyisocyanate; (2) a compound containing a plurality of isocyanate-reactive groups; and (3) an internal mold release system comprising (a) a polysiloxane compound and (b) an amine salt of a carboxylic acid.

In the reaction system of the present invention and the process for producing molded articles utilizing the reaction system, the internal mold release agent is used in an amount of about 0.55 to about 18 and preferably about 2.6 to about 6 parts by weight based upon the weight of the reaction system.

Additives conventionally used in SRIM processes may also be used with the reaction systems of the present invention. Examples of suitable additives include catalysts, such as tertiary amines, organo-metallic compounds, etc.; fillers, such as calcium carbonate, silica, mica, wollastonite, wood flour, melamine, glass or mineral fibers, glass spheres, etc.; flame retardants, such as halogenated aromatics, phosphorous-containing compounds, melamine and aminoplast resins. Other useful additives include conventionally used pigments, surfactants and plasticizers. Such additives will be used in amounts which will be evident to one skilled in the art from the present disclosure.

Parts prepared with SRIM processes are usually prepared with a reinforcement mat pre-placed in the mold. The reaction system is injected into the closed mold over the mat. The resulting part is a mat-reinforced composite which is demolded after the reaction system cures.

The reaction systems of the present invention may be used with any reinforcement mat conventionally used in the SRIM art. Suitable reinforcement mats include woven or non-woven structural fibers such as glass, carbon, graphite, silicon carbide, alumina, titania, boron, cellulosic, lignocellulosic, aromatic polyamide and mixtures thereof. The final reinforced molded article may contain between 0.5 to about 95 wt % and preferably about 10 to about 90 wt % of the reinforcing material. The diameter of the fibers is not critical and may vary from about 0.001 to about 1.0 mm. The mat may be optionally pretreated with sizing agents, coatings, adhesion promoters and other kinds of surface treatments known in the art.

In the process for producing molded articles according to the present invention, the surfaces of the molds must be pre-treated with known external mold release agents or mixtures thereof. For example, the mold surfaces may be treated with conventional external mold release agents such as soaps; and waxes, e.g., carnuba wax, montan wax, etc.; and mixtures thereof. It is preferred that the external release agents(s) used have a high melting point and demonstrate little or no transfer to the molded parts.

The present invention will now be illustrated by reference to the following specific non-limiting examples.

EXAMPLES

The following examples demonstrate the release properties provided by the internal mold release systems of the present invention.

Example 1

Sample 1

| | Parts by Weight |
|---|---|
| A Side | |
| Rubinate ® M | 196.5 |
| B Side | |
| LG-650 | 100.0 |
| Glycerine | 5.00 |
| Niax L-5440 | 1.50 |
| Polycat 8 | 5.00 |
| UL 32 | 0.03 |
| Water | 1.50 |
| Hystrene ® 3695 | 6.30 |
| DC-1248 | 2.00 |

Rubinate® M is a standard polymeric MDI available from ICI Americas Inc.

LG-650 is an oxypropylated glycerol available from Arco Chemical having an equivalent weight of 86 and a functionality of 3.

Polycat 8 is an N,N-dimethylcyclohexylamine catalyst available from Air Products.

UL 32 is an organotin catalyst available from Witco Chemicals.

Hystrene® 3695 is dimerized oleic acid available from Witco Chemicals.

DC-1248 is a hydroxy-functional silicone fluid available from Dow Corning.

The A and B sides of Sample 1 were prepared at a mix ratio of 1.62:1 (A:B) to provide an index of 0.98 (98%). The reaction system was prepared by mixing the components of the B side at a temperature of 72° F. in a blending vessel until homogeneous. The polyol blend thus prepared and the polyisocyanate were then charged into a Cannon H-100 high pressure RIM metering unit. The component temperatures were maintained at 85° F. and the mixing pressure was maintained at 2000 psi. The injection rate of the mixture was 250 g/sec. The reaction system was then injected into an aluminum door panel mold maintained at a temperature range of 150°–155° F. The mold had a volume of 1250 cc and produced parts having a density of 0.6 g and a thickness of 2.5 mm.

Prior to injection of the reaction systems, a glass mat was placed into the mold. The mat used was an N-754 continuous strand non-woven glass mat available from Nico Fibers. The mat had a density of 1 oz. per square foot and a thickness of about 2.0 mm. The mat was cut in such a manner so that each produced part contained 18 wt % of the mat.

The aluminum mold was prepared by cleaning it to the bare metal by scrubbing with 2-methyl pyrrolidone which was then cleaned from the mold with mineral spirits. The surfaces of the mold were then waxed with Chem-Trend LH-1, a paste wax having a high temperature use range (i.e., about 185°–250° F.).

42 parts were made with this reaction system. All parts demonstrated good release from the mold.

Sample 2

| | Parts by Weight |
|---|---|
| A Side | |
| Rubinate ® M | 199.5 |
| B Side | |
| LG-650 | 100.0 |
| Glycerine | 5.00 |
| Niax L-5440 | 1.50 |
| Polycat 8 | 5.00 |
| PDI 4803 | 3.96 |
| Water | 1.50 |
| Hystrene ® 3695 | 6.50 |
| DC-1248 | 2.00 |

PDI 4803 is a carbon black pigment formerly available from PDI Inc., now available from Ferro Inc., and designated PDI 3488-030.

Niax L-5440 is a silicone available from Union Carbide.

Sample 2 was prepared in the same manner as set forth with regard to Sample 1 above. The system was prepared at a mix ratio of 1.59:1 (A:B) to provide an index of 0.98.

Two trials were conducted with Sample 2. In the first trial, 45 parts were prepared as described above with respect to Sample 1. All of the parts demonstrated good release from the mold.

In the second trial, 70 parts were prepared, again in the same manner as described above with respect to Sample 1. Good release characteristics were demonstrated in parts 1–46. Slight sticking to the mold was evident in parts 47–69, with failure of the system occurring with part no. 70.

The release performance of Sample 2 was further evaluated at a mix ratio (A:B) of 1.70:1. The index of this system was 1.05 (105%). This system was otherwise prepared in the same manner as set forth above with respect to Sample 1.

53 parts were prepared in the same manner as set forth above with respect to Sample 1. Good release characteristics were demonstrated in parts 1–46. Slight sticking to the mold was evident in parts 47–52, with failure occurring with part 53.

Comparative Sample 1

| | Parts by Weight |
|---|---|
| A Side | |
| Rubinate ® M | 194.4 |
| B Side | |
| Niax LG 650 | 100.0 |
| Glycerine | 5.0 |
| Niax L-5440 | 1.5 |
| Polycat 8 | 3.0 |
| UL-32 | 0.03 |
| Water | 1.5 |
| DC 1248 | 2.00 |

The reaction system of Comparative Sample 1 was prepared in the same manner as set forth above with respect to Sample 1. The system was prepared at a mix ratio of 1.72:1 (A:B) to obtain an index of 0.98 (98%).

11 parts were prepared with Comparative Sample 1 using the same method described above with regard to Sample 1. Parts 1–2 demonstrated good release characteristics, but parts 3–7 showed some sticking of the material to the plates of the mold. Parts 8–10 showed an increase in difficulty to demold with failure occurring with Part No. 11.

Comparative Sample 2

| | Parts by Weight |
|---|---|
| A Side | |
| Rubinate ® M | 196.8 |
| B Side | |
| Niax LG 650 | 100.00 |
| Glycerine | 5.00 |
| Niax L-5440 | 1.50 |
| Polycat 8 | 5.00 |
| Water | 1.50 |
| Hystrene ® 3695 | 6.30 |

The reaction system of Comparative Sample 2 was prepared in the same manner as set forth above with respect to Sample 1. The system was prepared at a mix ratio of 1.65:1 (A:B) to obtain an index of 0.98 (98%).

Eight parts were prepared using Comparative Sample 2 in the manner described above for Sample 1. Fair release was demonstrated with parts 1–6, and sticking of the resin material to the mold occurred with part 7. Failure occurred with part 8.

Example 2

The following formulations were prepared in the same manner as described in Example 1. All amounts are in parts by weight.

| | A | B | C | D |
|---|---|---|---|---|
| A-Side | | | | |
| Rubinate ® M | 204 | 204 | 204 | 201.5 |
| B-Side | | | | |
| Niax LG-650 | 100 | 100 | 100 | 100 |
| Glycerine | 5.0 | 5.0 | 5.0 | 5.0 |
| Niax L-5440 | 1.5 | 1.5 | 1.5 | 1.5 |
| Polycat 8 | 3.0 | 3.0 | 5.0 | 1.5 |
| Dabco T-45 | 2.5 | 2.5 | 2.5 | 2.5 |
| Dabco 8800 | 0.25 | 0.25 | 0.25 | 0.25 |
| Water | 1.6 | 1.6 | 1.6 | 1.6 |
| DC 1248 | 2.0 | 2.0 | 2.0 | 2.0 |
| Hystrene ® 3695 | 6.5 | 6.5 | 6.5 | — |
| Kemester 5510 | 13.5 | — | — | — |
| Kemester 5721 | — | 13.5 | — | 20.0 |
| Kemester 1000 | — | — | 13.5 | — |

Dabco T-45 is potassium octoate available from Air Products.

Dabco 8800 is a delayed action form of triethylene diamine available from Air Products.

Kemester 5510 is n-butyl stearate available from Witco Chemical.

Kemester 5721 is tridecyl stearate available from Witco Chemical.

Kemester 1000 is glycerol trioleate available from Witco Chemical.

The A and B sides of Samples A, B, C and D were prepared at a mix ratio of 1.50.

The polyol blend and the polyisocyanate were charged into a Cannon H-100 high pressure RIM metering unit. The component temperatures were maintained at 85° F. and the mixing pressure was maintained at 2000 psi. The injection rate was 250 g/sec.

An aluminum door panel substrate mold mounted in a 75 ton Cannon press was used as the surface from which release would be determined. The mold was maintained at a temperature of 155° F.

For each sample, the aluminum mold was first cleaned to bare metal with a sufficient quantity of 2-methyl pyrrolidone. The 2-methylpyrrolidone was wiped from the mold with mineral spirits. Following the cleaning, the mold was waxed with LH-1 high temperature paste wax available from Chem-Trend, Inc.

Door panels were then molded with each of Samples A, B, C and D. The reinforcement used was a 1 oz/ft$^3$ continuous strand glass mat available from Nico Fibers. The molded door panels had a glass content of 15–20%, a nominal thickness of 0.100 inches and a specific gravity of 0.50.

Samples A, B, C and D were evaluated by their release performance in forming the door panels described above. The evaluations were carried out until a maximum of twenty parts were obtained. A system providing 20 releases with the expectation of more was considered to be above average.

Each of Samples A, B, C and D provided at least twenty releases from the mold.

The examples set forth above demonstrate the unexpectedly superior results obtained by the present mold release system with respect to the elimination of sticking of the resin material to the mold and improved release characteristics. The Comparative Samples demonstrate that neither the polysiloxane compound nor a carboxylic acid compound alone provide the same or even adequate release performance in comparison to the present systems. The other examples further demonstrate the synergistic release characteristics obtained by the present systems in comparison to the release characteristics obtained by either of its components alone.

The present invention may be embodied in other specific forms without departing from the spirit and essential attributes thereof and accordingly, reference should be made to the appended claims, rather than to the foregoing specification as indicating the scope of the invention.

We claim:

1. A reaction system comprising:
   (1) an organic polyisocyanate;
   (2) at least one compound containing a plurality of isocyanate-reactive groups; and
   (3) an internal mold release system which is added to component (2), said internal mold release system comprising (a) a polysiloxane compound and (b) an amine salt of carboxylic acid.

2. A reaction system as in claim 1, where said internal mold release system further comprises a fatty acid ester compound.

3. A reaction system as in claim 2, wherein said fatty acid ester compound contains at least 22 carbon atoms.

4. A reaction system as in claim 3, wherein said fatty ester compound contains at least 31 carbon atoms.

5. A reaction system as in claim 2 wherein said fatty acid ester compound is selected from the group consisting of butyl stearate, tridecyl stearate, glyceryl trioleate, isocetyl stearate, ditridecyl stearate and dioctyl dimerate.

6. A reaction system as in claim 1, wherein said organic polyisocyanate (1) is selected from the group consisting of 4,4'-diphenylmethane diisocyanate, 2,4'-diphenylmethane diisocyanate, polymeric MDI, an MDI variant and mixtures thereof.

7. A reaction system as in claim 1, wherein said compound containing a plurality of isocyanate-reactive groups is selected from the group consisting of polyester polyols and polyether polyols.

8. A reaction system as in claim 1, wherein said organic polyisocyanate is polymeric diphenylmethane diisocyanate and said compound (2) containing a plurality of isocyanate-reactive groups is a polyether polyol.

9. A reaction system as in claim 1 wherein said carboxylic acid has a functionality of 1 to 4 and comprises 3 to 100 carbon atoms.

10. A reaction system as in claim 1 wherein said carboxylic acid is selected from the group consisting of dimerized oleic acid, oleic acid, adipic acid, lauric acid, stearic acid, hydroxystearic acid, terephthalic acid, behenic acid, arachidic acid, linoleic acid, linolenic acid, ricinoleic acid and mixtures thereof.

11. A reaction system as in claim 1 wherein said amine is a tertiary amine.

12. A reaction system as in claim 11, wherein said tertiary amine is selected from the group consisting of N,N-dimethyl cyclohexylamine, N,N dimethyl aminopropylamine, and amides of N,N-dimethyl aminopropylamine with stearic acid, oleic acid, hydroxy-stearic acid and dihydroxystearic acid.

13. A reaction system as in claim 1, wherein said polysiloxane compound comprises 0.5–20 mol percent of $R_aR'_bSiO_{[4-(a+b)]/2}$ units and from 80–99.5 mol percent of $R''_cSiO_{(4-c)/2}$ units where R is an isocyanate reactive organic radical, a has an average value of from 1–3, R' and R" are both non-isodyanate reactive organic radicals, b has an average value of from 0–2, a+b is from 1–3, and c has an average value of from 1–3, wherein the ratio of the total molecular weight of said polysiloxane compound to the total number of isocyanate reactive functional groups in said polysiloxane compound ranges from 100–3500, the combined formula weights of all isocyanate reactive organic radicals R do not exceed 40% of the total molecular weight of said polysiloxane compound, the combined formula weights of all non-isocyanate reactive radicals R'+R" together do not exceed 40% of the total molecular weight of said polysiloxane compound, the combined formula weights of all the organic radicals R+R'+R" together in the molecule do not exceed 60% of the total molecular weight of the molecule, said polysiloxane compound contains an average of at least two isocyanate reactive functional groups per molecule, at least two of the isocyanate reactive functional groups in each molecule are located on separate organic radicals R attached independently to different silicon atoms in said polysiloxane, said isocyanate reactive functional groups R are selected from the group consisting of alcohols, carboxylic acids, phenols, thiols, imino groups, enamine groups, primary or secondary aromatic amines which contain no oxygen and not more than one-nitrogen atom attached directly to, in conjugation with, or incorporated within, the aromatic ring nucleus, and secondary aliphatic amines wherein at least one of the alkyl carbon atoms, bonded directly to the nitrogen atom, is not a primary carbon atom, the molecular weight of said polysiloxane compound is from 1000 to 30,000 and said polysiloxane compound being substantially insoluble in liquid organic isocyanates.

14. A reaction system as in claim 13, wherein said polysiloxane compound has a molecular weight of 2,000–15,000.

15. A reaction system as in claim 13, wherein R, R' and R" are organic radicals attached to silicon by carbon to silicon bonds, by carbon-oxygen-silicon bonds or by carbon-sulfur-silicon bonds.

16. A reaction system as in claim 13, wherein R is selected from the group consisting of R'"—OH, R'"—CHOHCH$_2$OH, R'"—CHOHCH$_3$, R'"—SH, R'R"—NH$_2$, HNR$_2$'" and R'"—CH$_2$SH, wherein R'R" is a divalent linking group comprising carbon and hydrogen, carbon hydrogen and oxygen, carbon hydrogen and sulfur and carbon hydrogen-oxygen and sulfur.

17. A reaction system as in claim 16, wherein R is CH$_2$CH$_2$CH$_2$O —[CH$_2$CH(CH$_3$)O]$_n$—H, wherein n is 1 to 5.

18. A reaction system as in claim 13, wherein said polysiloxane compound has the formula (CH$_3$)$_3$SiO[Si(CH$_3$)$_2$O]$_{66}$[Si(CH$_3$)(C$_3$H$_6$O(CH$_2$CH(CH$_3$)O)$_{2.5}$H)O]$_3$Si(CH$_3$)$_3$ and said carboxylic acid is dimerized oleic acid.

19. A reaction system as in claim 1, further comprising water.

20. A reaction system as claimed in claim 1 wherein said polysiloxane compound is selected from the group consisting of (CH$_3$)$_3$SiO[Si(CH$_3$)$_2$O]$_{66}$[Si(CH$_3$)(C$_3$H$_6$O(CH$_2$CH(CH$_3$)O)$_{2.5}$H)O]$_3$Si(CH$_3$)$_3$[HOCH$_2$CH$_2$SCH$_2$CH$_2$(CH$_3$)$_2$SiO][Si(CH$_3$)$_2$O]$_{70}$[Si(CH$_3$)$_2$CH$_2$CH$_2$SCH$_2$CH$_2$OH],
(CH$_3$)$_3$SiO[Si(CH$_3$)$_2$O]$_{134}$[Si(CH$_3$)(C$_3$H$_6$OC$_2$H$_3$(OH)CH$_2$OH)—O]$_{16}$Si(CH$_3$)$_3$, (CH$_3$)$_3$SiO[Si(CH$_3$)$_2$O]$_{63}$[Si(CH$_3$)(C$_3$H$_6$OC$_2$H$_3$(OH)CH$_2$OH)—O]$_7$Si(CH$_3$)$_3$,
(CH$_3$)$_3$SiO[Si(CH$_3$)$_2$O]$_{65}$[Si(CH$_3$)(C$_3$H$_6$OC$_2$H$_3$(OH)CH$_2$OH)—O]$_5$Si(CH$_3$)$_3$, (CH$_3$)$_3$SiO[Si(CH$_3$)$_2$O]$_{56}$[Si(CH$_3$)(C$_3$H$_6$O(C$_2$H$_3$(OH)CH$_2$OH)O]$_{14}$Si(CH$_3$)$_3$,
CH$_3$CH(OH)CH$_2$OC$_3$H$_6$Si(CH$_3$)$_2$O[Si(CH$_3$)$_2$O]$_{89}$Si(CH)$_3$)$_2$C$_3$H$_6$OC$_2$H$_4$(OH)CH$_3$, (CH$_3$)$_3$SiO[Si(CH$_3$)$_2$O]$_{66}$ [(CH$_3$)Si(C$_4$H$_8$—PH—NH(C$_3$H$_7$)O]$_3$Si(CH$_3$)$_3$, where PH=phenylene
(CH$_3$)$_3$SiO[Si(CH$_3$)$_2$O]$_{55}$[HOCH$_2$CHOH—CHOHCH(CH$_2$OH)CH(CH$_2$OH)Si(CH$_3$)O]$_{14}$Si(CH$_3$)$_3$, and
(CH$_3$)$_3$SiO[Si(CH$_3$)$_2$O]$_{61}$[(CH$_3$)Si(C$_3$H$_6$OCH$_2$CH(OH)CH$_2$OH)O]$_9$Si(CH$_3$)$_3$.

21. A reaction system comprising:

(1) an organic polyisocyanate;

(2) at least one compound containing a plurality of isocyanate-reactive groups; and (3) an internal mold release system which is added to component (2), said internal mold release system comprising (a) a polysiloxane compound and (b) a fatty acid ester compound.

22. A process for producing molded articles comprising reacting a reaction mixture comprising:

(1) an organic polyisocyanate;

(2) at least one compound containing a plurality of isocyanate-reactive groups; and (3) an internal mold release system which is added to component (2), comprising (a) a polysiloxane compound and (b) an amine salt of a carboxylic acid.

23. A process as in claim 22, wherein said internal mold release system further comprises a fatty acid ester compound.

24. A process as in claim 22, wherein said reaction mixture further comprises water.

25. A process as in claim 22, wherein said reaction mixture is reacted over a reinforcement mat comprising glass fibers.

* * * * *